United States Patent [19]

Swidler et al.

[11] 4,150,021
[45] Apr. 17, 1979

[54] ESTERS OF CELLULOSE WITH PHOSPHONIC ACID DYES HAVING A SULFONAMIDE BRIDGE

[75] Inventors: Ronald Swidler; William A. Sanderson, both of Palo Alto, Calif.

[73] Assignee: Burlington Industries, Inc., Greensboro, N.C.

[21] Appl. No.: 876,052

[22] Filed: Feb. 8, 1978

Related U.S. Application Data

[63] Continuation of Ser. No. 710,155, Jul. 30, 1976, abandoned, and a continuation-in-part of Ser. No. 534,349, Dec. 18, 1974, abandoned, which is a continuation-in-part of Ser. No. 441,393, Feb. 11, 1974, abandoned, which is a continuation-in-part of Ser. No. 260,587, Jun. 7, 1972, abandoned.

[51] Int. Cl.² ............... C09B 62/82; D06P 1/04; D06P 1/38; D06P 3/34
[52] U.S. Cl. ............... 260/198; 260/199; 260/200; 260/201; 260/502.4 R; 536/34
[58] Field of Search ............... 260/198, 199, 200, 201; 536/34

[56] References Cited

U.S. PATENT DOCUMENTS

| | | | |
|---|---|---|---|
| 2,959,582 | 11/1960 | Schimmelschmidt et al. | 260/163 |
| 3,947,435 | 3/1976 | Pekmeze et al. | 260/190 |

FOREIGN PATENT DOCUMENTS 570826  2/1959  Belgium ............... 260/197

OTHER PUBLICATIONS

Arbuckle et al., Chemical Abstracts, vol. 61, 10814 to 10815 (1964).
Durand et al., Chemical Abstracts, vol. 61, 16202c (1964).

*Primary Examiner*—Floyd D. Higel
*Attorney, Agent, or Firm*—Cushman, Darby & Cushman

[57] ABSTRACT

Dyes of the formula

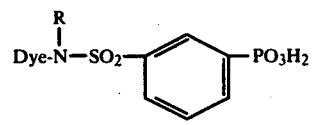

are disclosed which are useful in dyeings where the phosphonic acid group serves both as a water-solubilizing group and as a group capable of reacting to bond covalently with the fiber to be dyed. Application of the dyes to cellulose results in reactive dyeing by immobilization of the dye as a cellulose phosphonate ester. The dye substituent is a chromophore, e.g. an anthraquinone or azo chromophore, while R may be hydrogen or lower alkyl.

1 Claim, No Drawings

ESTERS OF CELLULOSE WITH PHOSPHONIC ACID DYES HAVING A SULFONAMIDE BRIDGE

CROSS-REFERENCE TO RELATED APPLICATIONS

This is a continuation of application Ser. No. 710,155, filed July 30, 1976, now abandoned, which is a continuation-in-part of Ser. No. 534,349, filed Dec. 18, 1974 (now abandoned), which in turn is a continuation-in-part of Ser. No. 441,393, filed Feb. 11, 1974 (now abandoned), which is a continuation-in-part of Ser. No. 260,587, filed June 7, 1972 (now abandoned).

BACKGROUND OF THE INVENTION

The present invention relates to new dyes and to dyeing of fibers. More particularly, the invention is directed to new phosphonic acid dyes. In use, the chromophore of these new phosphonic acid dyes becomes covalently linked through a condensation residue to sites on the fiber.

Dyes are retained in fibers by physical adsorption, salt or metal-complex formation, solution, mechanical retention or the formation of covalent chemical bonds. Physical adsorption and solution, in which the dye is partitioned between the fiber and the surrounding aqueous phase, are equilibrium reactions, and only by very careful selection of the dyes used can good washfastness properties be achieved. Salt and metal complex formation are also equilibrium reactions and, though generally the retention of the dye is favored more than in physical adsorption, washfastness may still present a problem. The dyes that are held by mechanical retention (azoics, vats and sulfurs) are virtually insoluble in water and show excellent fastness to washing but have other disadvantages. They are, for example, difficult and expensive to apply; loose dye, which is not easily washed off, may be deposited on the surface, resulting in low fastness to rubbing (crockfastness), and the final shade of the dyeing does not develop until completion of the whole dyeing cycle and aftertreatments.

Chemical bonding of dye to fiber for fixation of dye was recognized as early as 1895. Reactive dye systems require that the dyes contain a functional group capable of forming a covalent chemical bond with the fiber.

Today's commercial fiber-reactive dyes are employed widely in coloring cellulosics and proteinaceous fibers. They exhibit excellent washfastness, resistance to rubbing, tinctorial powers, ease of application and leveling.

Most of the commercial systems in which today's fiber-reactive dyes are employed are based upon chemistry where the reaction is effected under alkaline conditions. Prior to applicants' aforesaid applications, there was only one such system which operated effectively at an acid pH. Such a system is desirable in the dyeing of mixed fabrics, such as cotton blends with polyester, wool or nylon, the latter two fibers being dyeable by acid dyes. However, acid dyes generally have no affinity for cellulose and usually only find use in dyeing of proteinaceous fibers.

SUMMARY OF THE INVENTION

The present invention provides new dyes for systems used in dyeing hydroxy-substituted substrates in which the reaction can be conducted in acidic to mildly alkaline solution.

The new dyes are of the formula

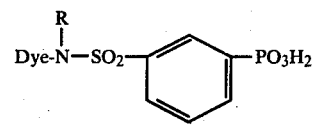

wherein D is a chromophore and R is hydrogen or lower alkyl, e.g., alkyl of 1 to 8 carbon atoms, usually 1 to 4 carbon atoms, such as methyl, ethyl, propyl, butyl, sec. butyl, amyl, hexyl, octyl. They are most readily made by reaction of the appropriate amino-substituted dye with m-phosphonobenzenesulfonyl chloride.

These dyes are commonly referred to as acid dyes. Though these are not "fiber-reactive dyes" in the art recognized sense of the term, the new dyes can be made to react with the substrate to be dyed, if used in the process disclosed in our copending application Ser. No. 534,349 now abandoned. They are especially suited to dyeing of cellulosic materials.

Methods for introducing phosphonic acid groups into dye molecules are far more limited than those commonly used for introducing sulfonic groups. Accordingly, a class of dyes made by a method providing a new route to incorporation of aromatic phosphonic acid units into dye molecules would be of great value.

DESCRIPTION OF THE INVENTION

A new dye family of the general formula (I)

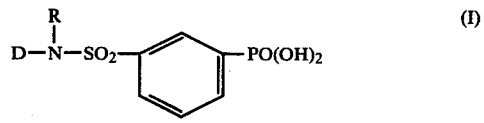

wherein D- is a chromophore and R is hydrogen or lower alkyl, has been discovered. By lower alkyl is meant an alkyl of 1 to 8 carbon atoms, usually 1 to 4 carbon atoms.

The D- moiety of formula (I) can be of diverse type and structure. It may be an anthraquinone, phthalocyanine, monoazo, polyazo, benzanthrone, naphthoquinone, triarylmethane or cyanine type chromophore. The D-moiety may be an azo-coupled naphthol group. It may contain aqueous solubilizing groups, such as sulfonate, and may contain other substituents that do not interfere with aqueous solubility characteristics or the dye fixation esterification reaction. In a particularly preferred embodiment, the D-moiety may also contain one or more phosphonic acid groups.

Of the various phosphorus-acid-substituted dyes encompassed by formula (I), those dyes containing more than one phosphonic acid group are preferred. Dyes of formula (I) which contain more than one phosphonic acid group result in much higher fixation to fabrics dyed in accordance with the process disclosed in our copending application Ser. No. 534,349.

The dyes of formula (I) are prepared by the reaction of (1) any of the aforementioned dyes (including anthraquinone, phthalocyanine, monoazo, polyazo, benzanthrone, pyrazolone, naphthoquinone, triarylmethane or cyanine types) which contains a free —NH$_2$ group or a group —NHR$_1$ where R$_1$ is lower alkyl with (2) m-phosphonobenzenesulfonyl chloride. The reaction between (1) and (2) is usually undertaken at about 0° C (up to 10° C) at a pH which is only mildly acidic. Thus, another manner of defining the dyes of formula (I) is to refer to them as m-phosphonobenzenesulfonyl chloride derivatives of known dyes containing a reactive amino (—NH$_2$ or NHR$_1$ above) group.

If it is desired to modify the dye produced above by adding additional phosphonic acid groups, such modification can be undertaken under suitable circumstances. For instance, if the dye containing the free —NH$_2$ group or —NHR$_1$ group is in addition a 1,3-naphtholsulfonic acid, that dye can be reacted with diazotized m-aminobenzenephosphonic acid in a manner well known to the art to modify the naphthol moiety by substitution of an azophenylphosphonic acid group.

The dyes of the invention may be readily used on available machinery used for dyeing or textile printing processes and for continuous or non-continuous variations of such processes. The fibrous or sheet material may be impregnated with the dye and curing agent mixture, dried, and then subjected to curing by heating, for example, in a hot flue dryer, an oven or a stenter. The impregnation may be carried out, for example, by padding material with an aqueous solution containing the dye and curing agent. The dye treatment may also be carried out by textile printing methods, for example, by locally treating the textile with a solution containing the dye and condensation agent and thereafter subjecting the printing material to an elevated temperature for curing. In particular, the new compounds of the invention are used in a preferred embodiment according to the process disclosed and claimed in our U.S. application Ser. No. 534,349, wherein dyes of the invention are admixed with a carbodiimide, such as cyanamide, preferably a mineral acid, such as H$_3$PO$_4$, and optionally a surfactant; the fabric is padded with an aqueous solution of said mixture, dried and then cured.

Application of the dyes of the invention to cellulose results in reactively dyed fabric by immobilization of the dye as a cellulose phosphonate ester according to the following general reaction

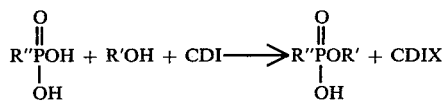

wherein R″P(OH)$_2$ is an abbreviation for dyes of the invention,

R″ is a chromophore, R′OH is cellulose, CDI is a carbodiimide, and CDIX is a CDI residue or by-product. Cyanamide, a preferred carbodiimide, gives urea as its by-product, CDIX. The fiber-reacted dye ester formed with cellulose results in a substantial and washfast dyeing of cotton and other cellulosic or hydroxy-containing substrates.

The invention will now be illustrated with specific examples of practice. It is to be understood that these examples are presented solely for purposes of illustration and not by way of limitation and alternative materials may readily be substituted without departing from either the spirit or scope of the invention.

DESCRIPTION OF THE PREFERRED EMBODIMENTS

EXAMPLE 1

Preparation of m-phosphonobenzenesulfonyl chloride

The preparation was undertaken as a modification of the process for forming 3-carboxybenzenesulfonyl chloride as reported in *J. Chem. Soc.* (C), page 11 et seq. (1968) by R. J. W. Cremlyn. Phenylphosphonic acid was added in portions to chlorosulfonic acid; about 10 moles of chlorosulfonic acid per mole of phenylphosphonic acid were employed. The initial mixing step was exothermic, causing the temperature of the mixture to rise to about 90° C. After completion of the addition of the phenylphosphonic acid to the chlorosulfonic acid, the reaction mixture was heated to about 140° C for about two hours. Reaction proceeded according to the equation

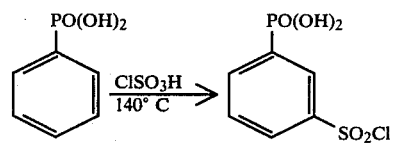

Attempts to lower the molar ratio of chlorosulfonic acid: phenylphosphonic acid, by addition of sodium chloride (to remove sulfuric acid from the reaction mixture), caused uncontrollable frothing.

The reaction mixture was poured over ice to isolate the crude product. The best method of purifying it was to dissolve it in a minimum amount of cold water and reprecipitate with concentrated HCl. The yield of product, m.p. 139–141° C, was 53%.

EXAMPLE 2

H-acid (81% pure, 43.5 g, 0.1 mole) was suspended in 300 ml water and 100 g ice, and the pH was adjusted to 6 with sodium hydroxide solution. Sodium acetate trihydrate (39 g, 0.3 mole) was added, followed by m-phosphonobenzenesulfonyl chloride (30 g, 0.12 mole) in portions over 10 minutes, the temperature being maintained at 10° C and the pH at 6. The solution was stirred for three hours in an ice bath, and then sodium carbonate (25 g) was added.

m-aminophenylphosphonic acid (17.4 g, 0.1 mole) and sodium carbonate (11 g, 0.1 mole) were dissolved in 100 ml water. Sodium nitrite (76 g, 0.11 mole) in 20 ml water was added, and the solution cooled to 10° C. The solution was added to a mixture of 25 ml concentrated hydrochloric acid and 100 g ice and the whole then poured rapidly into the foregoing sulfonamide reaction mixture. The combined solutions were stirred for one hour, after which 80 ml concentrated hydrochloric acid was added and the solution filtered to yield a red dye which was converted by passage through an acid ion exchange resin to its free acid form with the structure:

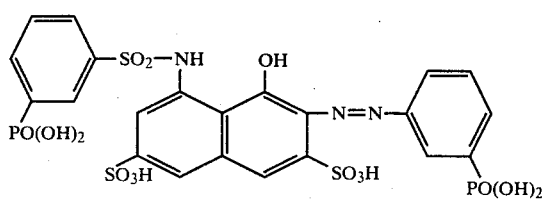

EXAMPLE 3

Example 2 was repeated, replacing the H acid with J acid, producing an orange dye of the formula

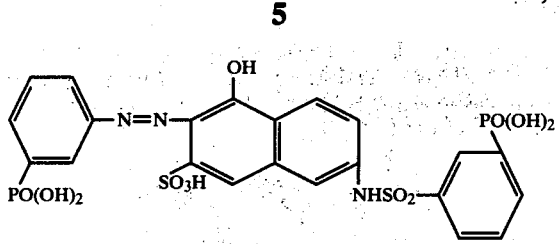

EXAMPLE 4

Example 2 was repeated, replacing H acid with N-methyl J acid, to produce an orange dye of the formula

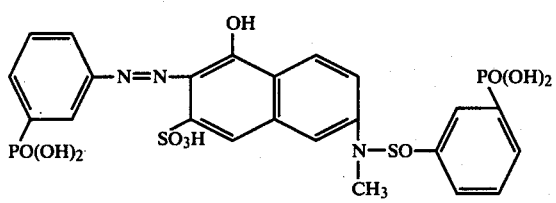

EXAMPLE 5

Example 3 was repeated, with the m-aminobenzenephosphonic acid replaced with metanilic acid, producing an orange dye of the formula

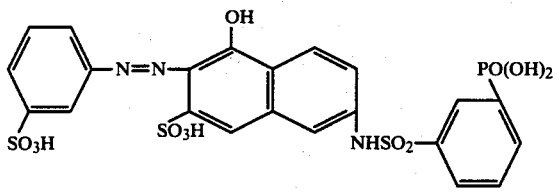

EXAMPLE 6

An aqueous dye solution was made with the solution containing 1%, by weight, of the orange dye of Example 3, 1%, by weight, of cyanamide and 0.1%, by weight, of a surfactant (Triton X100). Rayon, nylon and wool fabrics were padded in the dye solution, dried for five minutes at 180° F and cured for 90 seconds at 390° F. After one home laundering, the dyed samples showed significant dye fixation, with the rayon dyed the most strongly, followed, in order, by wool and nylon.

EXAMPLE 7

An aqueous dye solution was prepared with the orange dye of Example 4, containing 1%, by weight, of the dye and 1%, by weight, of cyanamide. Cotton fabric was then padded in the dye solution and then dried for five minutes at 180° F and thereafter cured for 90 seconds at 390° F. After one home laundering, the dye sample showed excellent dye fixation.

EXAMPLE 8

An aqueous dyebath was prepared containing the following percentages by weight:
1.5% red dye of Example 2
0.1% Igepal CO-710, nonylphenoxypoly(ethyleneoxy)ethanol
0.125% $H_3PO_4$
4.0% dicyandiamide
3.0% cyanamide
pH adjusted to 5.0 with $NH_4OH$ Fabrics of 100% cotton and 50/50 polyester/cotton were padded, dried for five minutes at 180° F, and cured for 90 seconds at 415° F. The fixation of the dye was determined with the Beckman DBG Spectrophotometer, the color value after the curing oven being taken as 100% and the value after a process rinse as a measure of the fixed dye. Fixation was essentially 100% on both cotton and polyester/cotton.

EXAMPLE 9

The dyeings and fixation evaluations of Example 8 were repeated, with the red dye substituted with the orange dye of Example 5. Fixation was measured at 85% on cotton and 90% on polyester/cotton.

The sulfonamido-bridged dyes of the invention have a number of distinctive advantages, both as a class and as individuals. As noted hereinbefore, the use of m-phosphonobenzenesulfonyl chloride as a reactant greatly enlarges the range of phosphonic acid dyes which can be synthesized, it having long been recognized that the phosphonic acid group generally cannot be introduced nearly so readily as the ubiquitous, but only superficially closely related sulfonic group.

The dyes of the invention have the distinct advantage, compared to conventional reactive dyes which are applied under strongly alkaline conditions, that they mostly are applied under acidic conditions and thus may be applied together with disperse dyes in the same dyebath. alkaline conditions lead to flocculation of the majority of disperse dyes, which fact drastically limits the possibilities for simultaneous dyeings of polyester and cotton with disperse and conventional reactive dyes. In contrast, the acid fixing conditions used with the sulfonamido-bridged phosphonic dyes of the invention have no adverse effect on disperse dyes, and the two types of dyes can be used together without difficulty.

In the sulfonamido-bridged dyes of the invention, the same phosphonic acid group which provides a site for reaction also serves as a strong water-solubilizing group for aiding removal of any dye molecules which are not fixed, thereby insuring efficient removal of unfixed dye during process rinsing, and reducing or even eliminating subsequent drawn-out washdown during customer use.

Although formulated herein in their free acid form, the sulfonamido-bridged dyes of the invention may also be made and used as their alkali metal or ammonium salts, or mixtures thereof. They preferably are used in their free-acid form, more preferably in their ammonium or an acid ammonium salt form. Salts of the dyes with amines which are volatile under cure conditions may also be used. The ammonium and acid ammonium salts are conveniently made by adding ammonium hydroxide to solutions of the free-acid dye. Correspondingly, upward adjustments of pH in the dyebath are preferably made with ammonia, less preferably with a volatile amine, such as dimethylamine. Downward adjustments of pH, if needed, preferably are made with hydrochloric acid or other acid volatile under curing conditions.

When used at low pH, the novel free acid dyes of the invention are used in aqueous solution. At higher pH, the nature of the ammonium or alkali metal content of the solution will depend upon the ammonia or alkali metal content of the solution as measured by the pH.

The ammonium salts are usually tri- or tetra-ammonium salts, or mixtures thereof, within the general pH range employed. Mixtures of ammonium and alkali metal salts may also be used.

It is to be understood that only preferred embodiments of the invention have been described and that numerous alternatives, substitutions and modifications are all permissible without departing from the spirit or scope of the invention as defined in the following claims.

What is claimed is:

1. The ester obtained by reacting a hydroxy group of a cellulosic material with the phosphonic acid group of a dyestuff of the formula:

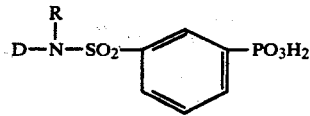

wherein D is a chromophore and R is hydrogen or lower alkyl, in the free acid or ammonium, acid ammonium salt or alkali salt form.

* * * * *